(12) United States Patent
Corey

(10) Patent No.: US 11,867,446 B2
(45) Date of Patent: Jan. 9, 2024

(54) DUAL-MODE ULTRALOW AND/OR CRYOGENIC TEMPERATURE STORAGE DEVICE

(71) Applicant: John A. Corey, Melrose, NY (US)

(72) Inventor: John A. Corey, Melrose, NY (US)

( * ) Notice: Subject to any disclaimer, the term of this patent is extended or adjusted under 35 U.S.C. 154(b) by 0 days.

(21) Appl. No.: 17/659,943

(22) Filed: Apr. 20, 2022

(65) Prior Publication Data

US 2023/0023822 A1    Jan. 26, 2023

Related U.S. Application Data

(60) Provisional application No. 63/223,688, filed on Jul. 20, 2021.

(51) Int. Cl.
*F25D 29/00* (2006.01)
*F25D 3/10* (2006.01)

(52) U.S. Cl.
CPC ......... *F25D 29/001* (2013.01); *F25D 3/105* (2013.01)

(58) Field of Classification Search
CPC .......... F25D 29/001; F25D 3/105; F17C 2203/0312; F17C 3/10; F17C 2227/0386
See application file for complete search history.

(56) References Cited

U.S. PATENT DOCUMENTS

| | | | |
|---|---|---|---|
| 2,093,839 A | 9/1937 | Killen | |
| 2,148,109 A * | 2/1939 | Hansen | F17C 3/10 62/DIG. 13 |
| 4,292,062 A * | 9/1981 | Dinulescu | F17C 3/08 62/7 |
| 4,856,285 A | 8/1989 | Acharya et al. | |
| 5,309,722 A * | 5/1994 | Phillips, Jr. | F25D 3/10 62/52.1 |
| 6,062,030 A | 5/2000 | Viegas | |
| 6,205,794 B1 | 3/2001 | Brothers | |
| 6,438,969 B1 | 8/2002 | Laskaris et al. | |
| 6,505,469 B1 * | 1/2003 | Drube | F17C 7/04 62/48.1 |
| 8,534,079 B2 | 9/2013 | Brooks | |
| 2009/0193817 A1 * | 8/2009 | Germain | F25D 16/00 62/51.1 |
| 2016/0144764 A1 * | 5/2016 | Dutta | B60H 1/00364 62/64 |
| 2019/0226745 A1 | 7/2019 | Barker | |

OTHER PUBLICATIONS

International Search Report and Written Opinion from PCT/US2022/025577 dated Jul. 29, 2022, 15 pages.
International Preliminary Search Report dated May 12, 2023 from PCT/US2022/025577 filed Apr. 20, 2022; 7 pages.

* cited by examiner

*Primary Examiner* — David J Teitelbaum
(74) *Attorney, Agent, or Firm* — Hoffman Warnick LLC

(57) ABSTRACT

A low-temperature storage device includes an inner vessel, an outer vessel about the inner vessel, a thermal insulation layer between the inner vessel and the outer vessel, and a single heat exchanger in thermal communication with an interior of the inner vessel and adapted to be connected to at least one of an evaporator in a closed-loop refrigeration circuit and an open-loop evaporator for an externally-supplied cryogen. The inner vessel can be a vacuum-insulated vessel, and the heat exchanger can be an internal heat exchanger including at least two fluid circuits: a first circuit with one external connection and one internal connection into the inner vessel and the second circuit with two external connections.

7 Claims, 4 Drawing Sheets

DUAL-MODE ULTRALOW AND/OR CRYOGENIC TEMPERATURE STORAGE DEVICE

BACKGROUND

The present disclosure relates to low temperature storage devices, and more specifically, to a dual-mode, high efficiency ultralow or cryogenic temperature storage device.

Currently, low temperature storage devices or freezers for preservation of biological materials are grouped into two broad categories: 'ultralow' having temperatures in the range of –80 to –100° C. and sometimes to –150° C., and 'cryogenic' having temperatures below that possible with mechanical refrigeration systems, e.g., <–150° C. Ultralow freezer units cool using closed-circuit mechanical refrigeration, while cryogenic freezer units cool by evaporation of consumable liquid cryogens, like liquid nitrogen. The ultralow freezer units are more convenient as they can operate on regular electric power, but are very costly to operate due to low thermodynamic efficiency. The cryogenic freezer units are more economical to operate and are required for long-term storage stability, but require externally supplied cryogens. Typical biological laboratories and repositories must have some mix of both types of systems and have excess capacity to assure adequate mix of the needed type, adding cost and complexity to the operations of such facilities. Additionally, manufacturers must produce and stock multiple types of devices, adding cost for them and end-users.

U.S. Pat. No. 8,534,079 to J. Brooks attempts to improve the efficiencies of a cryogenic freezer in a vacuum-insulated cryogenic freezer by avoiding an open pool of evaporating cryogen in the storage space and instead providing a discrete heat exchanger with a serpentine passage for introducing the cryogen. In the latter case, the cryogen is metered into the heat exchanger in response to a temperature signal. The cryogen is substantially all evaporated in the serpentine passages of the heat exchanger. This approach enables the storage space temperature to be controlled independent of the normal boiling temperature of an open liquid, cryogen pool. Prior cryogen-cooled freezers were restricted to operate only at a saturation condition of the cryogen, most usually 77° K (–196° C.) for liquid nitrogen at one atmosphere pressure. This approach enables more economical operation by allowing temperatures in the range of up to –100° C., where mechanical ultralow freezers become more competitive. However, the '079 patent freezer still requires an external supply of liquid nitrogen, together with the costly and bulky supply connections and cryogenic valves to control that supply. Such a system is only viable in specialized facilities and typically is limited to the first floor of such facilities. The system also represents a substantial fixed cost associated with the freezer.

Another system uses a compound, mechanical/cryogen cooling system for transport applications, e.g., delivery trucks, where the cryogenic component serves as a booster for periods of high cooling load. Normally, such transport vehicles are cooled with ordinary vapor-compression (V-C) refrigeration systems, but in especially hot climates, the loading and unloading steps (with open doors) can allow storage space temperatures to rise and a reasonably sized V-C refrigerator can take too long to restore the space to a target temperature, risking spoilage and loss of the goods therein. In this approach, see U.S. Pat. No. 6,062,030 to Viegas, a cryo-blast system can be added to such refrigerated transports, to make use of the high, but short-duration cooling of cryogen flow. Such a cryo-blast system comprises an add-on circuit including a cryogen storage tank, a supply valve connecting the tank to a second heat exchanger (evaporator, independent of the primary V-C cooler equipment's evaporator) inside the cooled storage space, and a pressure relief valve preventing the admission and evaporation of the cryogen from causing excess pressure in the storage space. In some embodiments, the disclosed supply valve is manually controlled, which is acceptable for its intended momentary use after a load or unload activity has warmed the storage space. This approach uses two evaporators addressing a cooled space. However, the cryogen evaporator is expressly disclosed as a separate, add-on unit, for occasional boost cooling, and has limited efficacy beyond the stated application.

In another system, see U.S. Pat. No. 4,856,285 to Acharya et al., a sequential food freezing process uses an initial cryogen blast that freezes the product surface, to seal in moisture, followed by mechanical (V-C) cooling, e.g., between 0° C. and –10° C. This approach re-uses the evaporated cryogen waste stream to remove the waste heat from the mechanical cooling system (that is, enabling the mechanical system to run with a lower heat rejection temperature than the ambient).

None of the approaches addresses long-term storage of cryo- or ultra-low temperature frozen materials, typically below –100° C.

SUMMARY

An aspect of the disclosure is directed to a low-temperature storage device, including: an inner vessel; an outer vessel about the inner vessel; a thermal insulation layer between the inner vessel and the outer vessel; and a single heat exchanger in thermal communication with an interior of the inner vessel and adapted to be connected as at least one of: an evaporator in a closed-loop refrigeration circuit, and an open-loop evaporator for an externally-supplied cryogen.

Another aspect relates to a heat exchanger for a low-temperature storage device, comprising: a first circuit in thermal communication with a vessel, the first circuit including one external connection and one internal connection relative to the vessel, the first circuit adapted to be connected in a closed-loop refrigeration circuit as an evaporator; and a second circuit in thermal communication with the vessel, the second circuit including two external connections relative to the vessel, the second circuit adapted to be connected in an open-loop evaporator for an externally-supplied cryogen.

Another aspect includes a low-temperature storage device, comprising: an inner vessel; an outer vessel about the inner vessel; a thermal insulation layer between the inner vessel and the outer vessel; a single heat exchanger in thermal communication with an interior of the inner vessel; and a valve unit configured to select between delivering a refrigerant from: a mechanical refrigeration system or a source of a cryogen.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

Figure 1:
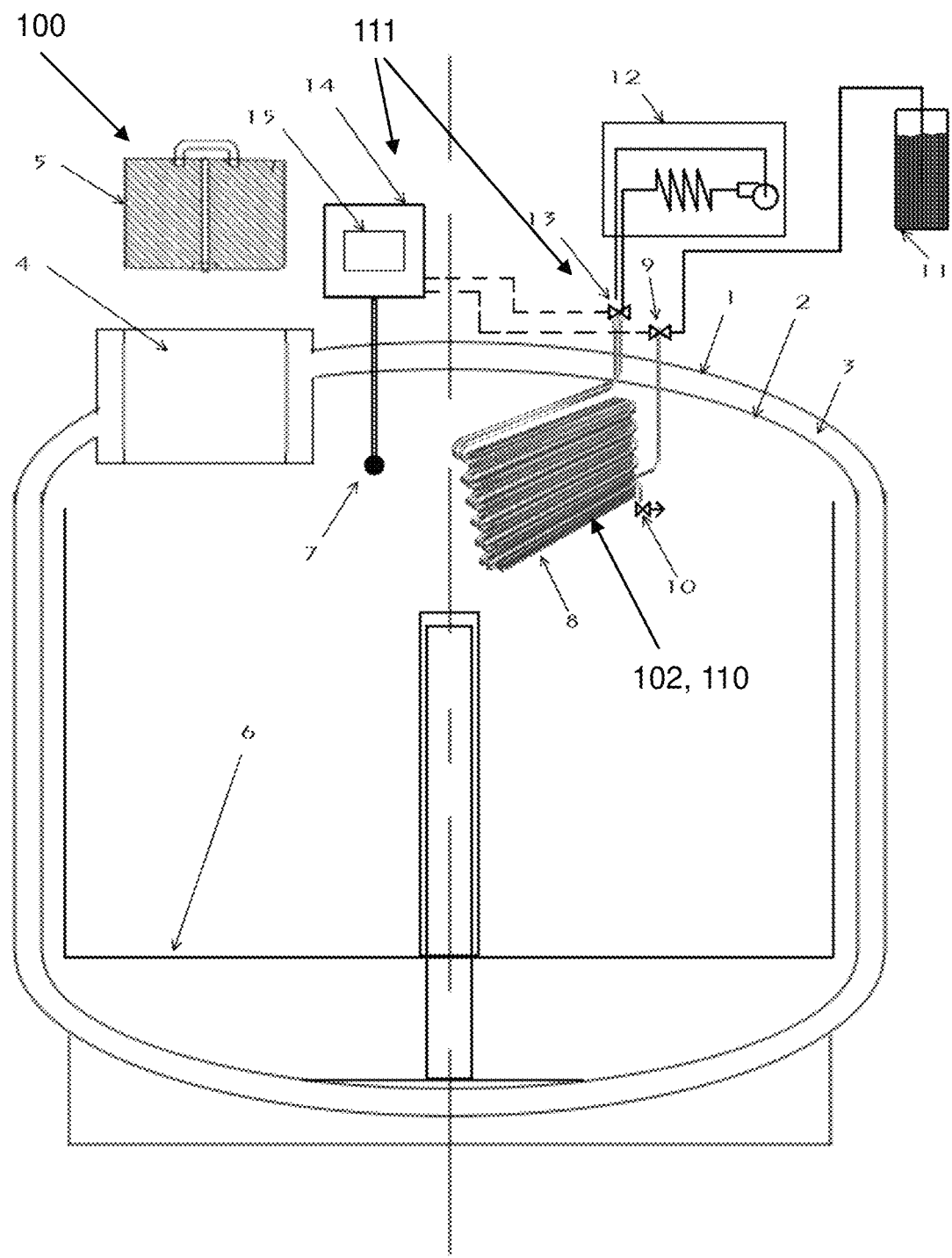
FIG. 1 shows a schematic view of a low-temperature storage device, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

A low-temperature storage device as used for, for example, long-term biotechnology sample and materials storage, includes an inner vessel; an outer vessel about the inner vessel; a thermal insulation layer between the inner vessel and the outer vessel; and a heat exchanger in thermal communication with an interior of the inner vessel and adapted to be connected as one of: an evaporator in a closed-loop refrigeration circuit, and an open-loop evaporator for an externally supplied cryogen. The inner vessel can be a vacuum-insulated vessel, and the heat exchanger can be an internal heat exchanger including at least two fluid circuits: a first circuit with one external connection and one internal connection, and the second circuit with two external connections. The storage device can be configured to be attached with: a supply of liquid cryogen to the first circuit or the second circuit, or a mechanical refrigeration unit to the second circuit, or a combination of cryogen supply to the first circuit and a mechanical refrigeration unit to the second circuit. The connection(s) used can be selected by the user, or can be fitted together for multiple circuit usage, either at mechanically cooled ultralow conditions, e.g., −80 to −100° Celsius, or at cryogenic conditions, e.g., at controlled temperatures below the efficient or practical reach of conventional mechanical cooling. A control system may be provided that includes at least one temperature sensor in the inner vessel, a least one valve to control the admission of cryogen or refrigerant to the heat exchanger, and a controller to operate the valve in response to the signal from the at least one temperature sensor to maintain the inner vessel interior and contents at or below a preset temperature. Embodiments of the disclosure may be used to store materials that are pre-frozen, for example, using a controlled-rate freezer that precisely controls the cooling to minimize damage to living cells as they form internal ices. The present storage device may receive those pre-frozen materials for long term preservation.

FIG. 1 shows a schematic view of a low-temperature storage device 100 according to embodiments of the disclosure. Device 100 may include an outer vessel 1 and an inner vessel 2. A space 3 between vessels 1, 2 may be evacuated and fitted with an insulation layer 3, e.g., a vacuum perhaps with multi-layer foils therein to prevent radiation penetration, a multi-layer reflective insulation, and/or a foam insulation. Device 100 may also include an opening 4 providing access to an interior of inner vessel 2 from outside of outer vessel 1, e.g., for insertion of material to be cooled or stored. An insulating closure 5 may be used to close and/or seal opening 4 when it is not in use. An optional interior racking system 6, such as a rotary carousel, may be provided inside inner vessel 2. A temperature sensor 7 for monitoring the temperature in the interior of inner vessel 2 may be provided. Temperature sensor 7 can include any now known or later developed temperature sensor such as but not limited to a thermocouple, and is in electrical communication with a controller 14.

Device 100 may also include a heat exchanger 8. In the FIG. 1 embodiment, heat exchanger 8 is located near the top of the interior of inner vessel 2, but it can be located anywhere within inner vessel 2. As will be described, heat exchanger 8 provides two circuits 102, 110. Device 100 may also include a valve 9 for controlling admittance of a cryogen from a supply of cryogen 11 to heat exchanger 8 in response to a temperature signal from within inner vessel 2, i.e., from temperature sensor 7. Heat exchanger 8 provides a first open-loop circuit 102. Device 100 also may include a pressure relief valve 10 at a selectively open end of heat exchanger 8 controlling the release of evaporated cryogen into the interior of inner vessel 2. Device 100 may also include a separable and optional external supply 11 of liquid cryogen connectable to the external connection of heat exchanger 8, i.e., the first open-loop circuit. The cryogen can be any now known or later developed cryogen, e.g., liquid nitrogen. Device 100 may also include a mechanical refrigeration system 12 which may be optionally connectable to heat exchanger 8 to form a closed-loop second circuit 110 so heat exchanger 8 functions as the evaporator of device 100. Device 100 may also include a flow control valve 13 for refrigerant in second circuit 110 in response to a temperature signal within the interior of inner vessel 2, e.g., from temperature sensor 7.

A control system 111 may include controller 14 responsive to a user-specified temperature setpoint and to an output of temperature sensor 7. Controller 14 is configured to control the flow of cryogen and/or refrigerant by controlling appropriate valves 9, 13. Valve 9 controls input of liquid cryogen to heat exchanger 8, and valve 13 controls input and output of refrigerant to heat exchanger 8. Optionally, control system 111 may include a monitor or display 15 showing, for example, current and past temperatures in inner vessel 2, and other operational data as desired.

In operation, heat exchanger 8 in FIG. 1 is operable in a cryogenic state in which only a supply of liquid cryogen 11 is coupled to one of the external connections of first circuit 102. Hence, liquid cryogen can pass through heat exchanger 8 and exit into inner vessel 2. Heat exchanger 8 is also operable in a mechanical refrigeration state in which only mechanical refrigeration system 12 is coupled to the two external connections of second circuit 110. Here, heat exchanger 8 operates as an evaporator for system 12. Controller 14 controls valves 9, 13 to determine the state of operation. That is, controller 14 (FIG. 1) may be responsive to a user-specified temperature setpoint and to an output of temperature sensor 7. In FIG. 1, controller 14 is configured to control the flow of cryogen or refrigerant through appropriate valves 9, 13 through first circuit 102 or second circuit 110. Optionally, a monitor and display 15 showing current and past temperature in inner vessel 2, and other operational data as desired, may be provided.

Figure 2:
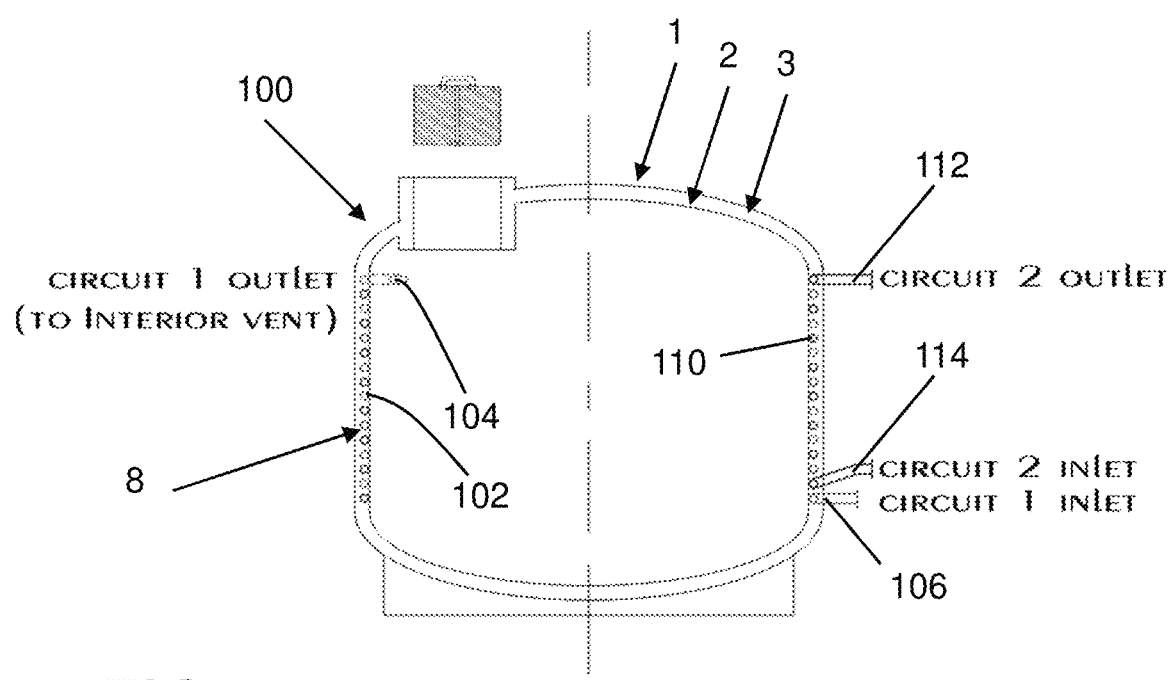
FIG. 2 shows a schematic view of a low-temperature storage device, according to other embodiments of the disclosure.

As shown in FIG. 2, in another second embodiment, heat exchanger 8 may be attached to and substantially cover inner vessel 2, or it may be embedded inside a wall of inner vessel 2 or in space 3 between outer and inner vessels 1, 2, respectively. Here, heat exchanger 8 has two separate circuits for fluid: a first circuit 102 being open to the interior of inner vessel 2 at an inner connection 104 at one end, and open to an exterior of vessels 1, 2 at an outer connection 106 at its other end. First circuit 102 may have a serpentine or helical path, for example. Heat exchanger 8 in FIG. 2 may also include a second circuit 110 closed to the interior of inner vessel 2 but having two external connections 112, 114. Second circuit 114 may have a serpentine or helical path, for example. Connections 106, 110, 112 may include any now known or later developed couplings for sealed fluid communication with other fluid conduits or fluid handling devices (e.g., valves), as necessary. In operation, controller 14 (FIG. 1) may be responsive to a user-specified temperature setpoint and to an output of temperature sensor 7. In FIG. 2, controller 14 is configured to control the flow of cryogen or refrigerant through appropriate valves 9, 13 (FIG. 1) through first circuit 102 and/or second circuit 110. Optionally, a monitor and display 15 (FIG. 1) showing current and past temperature in inner vessel 2, and other operational data as desired, may be provided.

In operation, heat exchanger 8 in FIG. 2 is operable in a cryogenic state in which only a supply of liquid cryogen 11 is coupled to one of the external connections of first circuit 102. Hence, liquid cryogen can pass through heat exchanger 8 and exit into inner vessel 2. Heat exchanger 8 is also operable in a mechanical refrigeration state in which only mechanical refrigeration system 12 is coupled to the two external connections of second circuit 110. Here, heat exchanger 8 operates as an evaporator for system 12. Heat exchanger 8 is also operable in a combination state in which the supply of liquid cryogen 11 is coupled to the external connection of first circuit 102 and mechanical refrigeration system 12 is coupled to the two external connections of second circuit 110.

In alternative embodiments, device 100 may include an open top vessel with a full-size lid, and no interior racking 6. Device 100 may also include a permanently attached mechanical refrigeration system 12 (FIG. 1) on vessel(s) 1, 2. Device 100 can also use a Stirling-cycle refrigeration device (instead of a vapor-compression).

Figure 3:
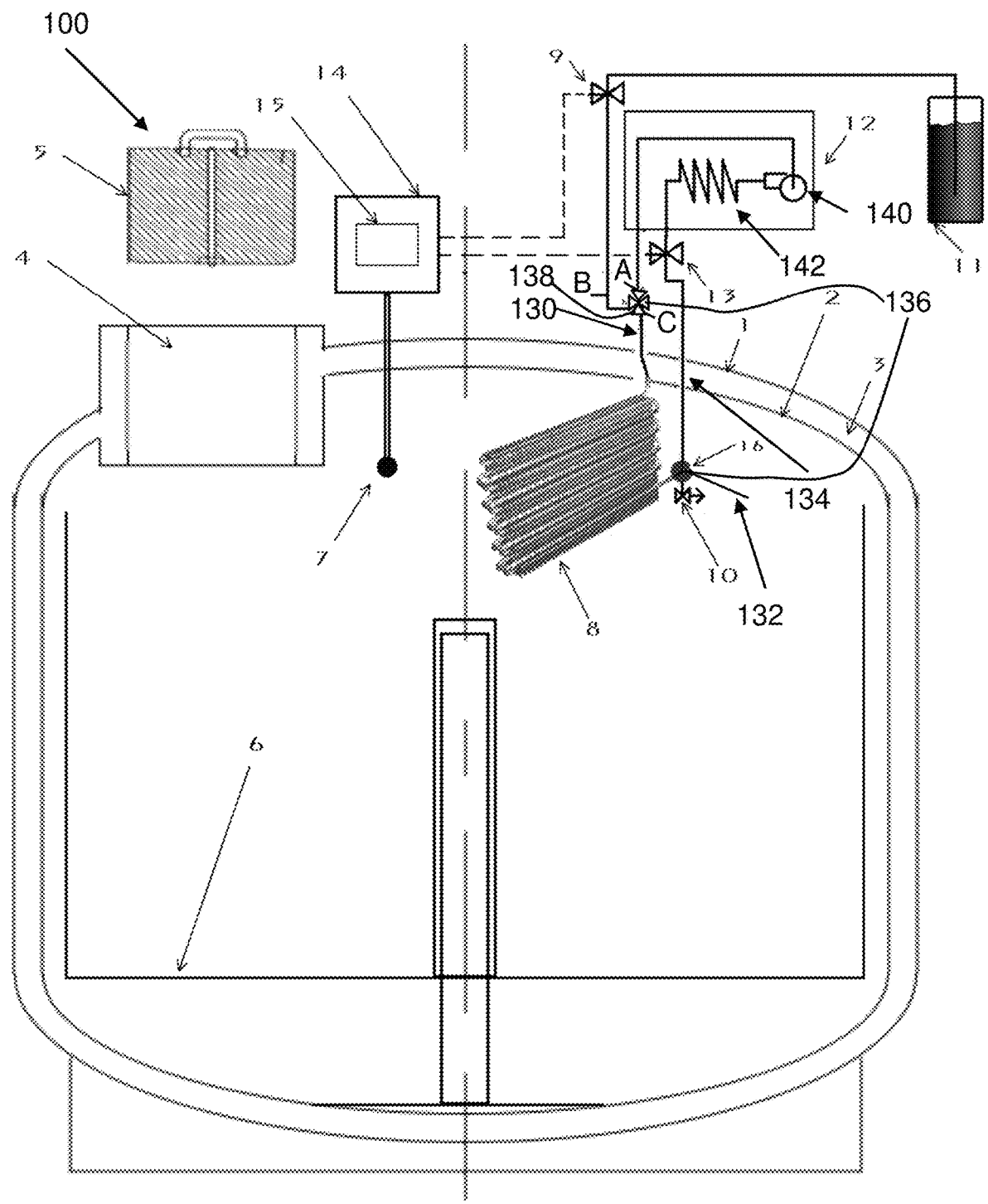
FIG. 3 shows a schematic view of a low-temperature storage device, according to yet other embodiments of the disclosure.

As shown in FIG. 3, in another embodiment, device 100 may include a single heat exchanger 8 with partially dual-circuit function, with one inlet 130, and two outlets 132, 134. One outlet 132 is openable to the interior of inner vessel 2 and the other outlet 134 is openable to the exterior of inner vessel 2 and may be connected to mechanical refrigeration system 12. A valve unit 136 includes a valve 138 for selecting between a refrigerant from mechanical refrigeration system 12 or source of cryogen 11, and a valve 16 for selecting one or the other outlet 132, 134 for connection to either the interior of vessel 2 (for cryogen) or closed-loop mechanical refrigeration system 12. That is, valve unit 136 is configured to select between delivering a refrigerant from: a mechanical refrigeration system or a source of a cryogen. Either fluid utilizes the shared portion of the circuit of single heat exchanger 8.

With further regard to FIG. 3, device 100 may include single heat exchanger 8, located near the top of the interior of inner vessel 2. Here, heat exchanger 8 includes two separate connections A or B for fluid. Device 100 may include a first serpentine circuit connection C, preferably outside vessels 1, 2, connectable to either a source of cryogen 11 at connection B, or one of a source or return to mechanical refrigeration system 12 at connection A, i.e., a closed-loop refrigerant circuit. Device 100 may also include a second serpentine circuit connection (three-way valve 16) preferably inside inner vessel 2 for connection either to inner vessel 2 interior (for when the first connection C is connected to a source of cryogen 11 at connection B) or to the other of a source or return of mechanical refrigeration system 12 at connection A (for when the first connection C is connected to the opposite of source or return from mechanical refrigeration system 12). Device 100 also includes a valve 9 controlling admittance of cryogen to first serpentine circuit connection C in response to a temperature signal from temperature sensor 7 from within inner vessel 2 for when first serpentine circuit connection C is coupled to a source of cryogen 11. A pressure relief valve 10 may be at an open end of heat exchanger 8, controlling the release of evaporated cryogen into the interior of inner vessel 2. Device 100 may also include a separable and optional external supply of liquid cryogen 11 optionally connectable to the external end of first serpentine circuit connection C.

Figure 4:
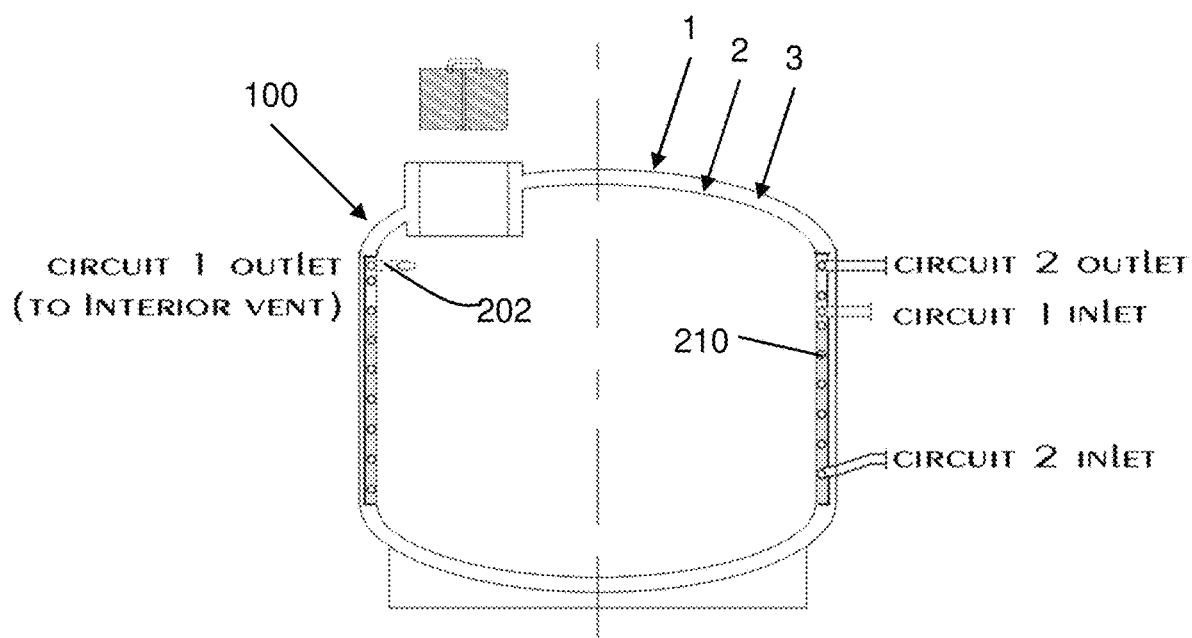
FIG. 4 shows a schematic view of a low-temperature storage device, according to embodiments of the disclosure.

As shown in FIG. 4, a full-surround or full-bath (non-serpentine) first open circuit 202 for cryogen on a wall of inner vessel 2 (similar to U.S. Pat. No. 6,205,794), and containing a second serpentine circuit 210 within the wall of inner vessel 2 for refrigerant of mechanical refrigeration system 12 (FIG. 1), may also be used.

As used herein, and as shown in FIGS. 1 and 3, mechanical refrigeration system 12 may include, in part, a compressor 140 and condenser 142, and may be optionally connectable to connections (e.g., valve 13 (FIG. 1), connection 112 (FIG. 2), connection C (FIG. 3)) for first circuit 102 of heat exchanger 8, such that heat exchanger 8 can function as the evaporator of mechanical refrigeration system 12. In FIG. 1, flow control valve 13 for refrigerant in mechanical refrigeration system 12 may operate in response to a temperature signal (sensor 7) within the interior of inner vessel 2. A controller 14 may control the flow of cryogen or refrigerant through appropriate valves (9 or 13, respectively) responsive to a user-specified temperature setpoint and to the output of the temperature-monitoring sensor 7. Optionally, a monitor and display 15 showing current and past temperature in inner vessel 2, and other operational data as desired, may be provided. A three-way valve 16 enables either open-circuit connection to a source of cryogen 11 or closed-circuit connection to an external mechanical refrigeration system 12 (valve 16 may be set manually at unit installation, to choose the appropriate source of cooling, and valve 16 is preferably inside inner vessel 2).

In another embodiment, heat exchanger 8 for a low-temperature storage device may include a first circuit 102 in thermal communication with a vessel 1, 2, the first circuit including one external connection and one internal connection relative to the vessel, the first circuit adapted to be connected (e.g., via sealed connections) in a closed-loop refrigeration circuit (mechanical refrigeration system 12) as an evaporator. Heat exchanger 8 may also include second circuit 110 in thermal communication with vessel 1, 2, the second circuit including two external connections relative to the vessel. Second circuit 110 is adapted to be connected (e.g., via sealed connections) in an open-loop evaporator for an externally-supplied cryogen 11.

Embodiments of the present disclosure enable simplification of production and application of freezer units in the rapidly growing field of cryo-biological sciences and medicine. It also reduces the load of electrical power consumption where ultralow freezer units are now used, and adds faster response to changing requirements in facilities with multiple freezers.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A low-temperature storage device, comprising:
   an inner vessel;
   an outer vessel about the inner vessel;
   a thermal insulation layer between the inner vessel and the outer vessel;
   a single heat exchanger within, and in thermal communication with, an interior of the inner vessel, the single heat exchanger including:
      an input connection on the exterior of the outer vessel, and
      an output connection within the inner vessel, wherein the single heat exchanger is adapted to be selectively connected as at least one of: an evaporator in a closed-loop refrigeration circuit, and an open-loop evaporator for an externally-supplied cryogen;
   a first valve on the exterior of the outer vessel and connected to the input connection, the first valve configured to selectively switch between a refrigerant from a mechanical refrigeration system and a cryogen from a cryogen source; and
   a second valve on the interior of the interior vessel and connected to the output connection, the second valve configured to selectively connect between the closed-loop refrigeration circuit or the open-loop evaporator.

2. The low-temperature storage device of claim 1, wherein the single heat exchanger is operable in:
   a cryogenic state in which only a supply of liquid cryogen is coupled to the single heat exchanger through the first valve; and
   a mechanical refrigeration state in which only a mechanical refrigeration system is coupled to the single heat exchanger through the first valve.

3. The low-temperature storage device of claim 2, wherein the input connection is at least partially embedded in a wall of the inner vessel.

4. The low-temperature storage device of claim 1, further comprising a control system including:
   at least one temperature sensor in the inner vessel;
   at least one valve controlling an admission of one of a cryogen and a refrigerant to the heat exchanger; and a controller to operate the at least one valve in response to a signal from the at least one temperature sensor to maintain an interior of the inner vessel at or below a preset temperature.

5. A low-temperature storage device, comprising:

an inner vessel;

an outer vessel about the inner vessel;

a thermal insulation layer between the inner vessel and the outer vessel;

a single heat exchanger within, and in thermal communication with, an interior of the inner vessel, the single heat exchanger including:
- an input connection on the exterior of the outer vessel, and
- an output connection within the inner vessel, the single heat exchanger adapted to be selectively connected as at least one of: an evaporator in a closed-loop refrigeration circuit, and an open-loop evaporator for an externally-supplied cryogen;

a valve unit on the exterior of the outer vessel and configured to selectively switch between the refrigerant from a mechanical refrigeration system and a cryogen from a cryogen source; and a three-way valve unit on the interior of the interior vessel and connected to the output connection, the three-way valve unit configured to selectively connect to the interior of the interior vessel and the mechanical refrigeration unit.

6. The low-temperature storage device of claim 5, further comprising a control system including the valve unit and at least one temperature sensor in the interior of the interior vessel, the control system configured to control the valve unit in response to a signal from the at least one temperature sensor.

7. The low-temperature storage device of claim 5, further including a removable insulating closure within an opening, the opening being through both the interior vessel and through in the exterior vessel.

* * * * *